No. 882,842. PATENTED MAR. 24, 1908.
F. H. RICHARDS.
CARVING MACHINE.
APPLICATION FILED MAY 22, 1902.

6 SHEETS—SHEET 1.

Witnesses:
H. C. Abbott
Robert Head

Inventor,
F. H. Richards.

No. 882,842. PATENTED MAR. 24, 1908.
F. H. RICHARDS.
CARVING MACHINE.
APPLICATION FILED MAY 22, 1902.

6 SHEETS—SHEET 3.

Witnesses:
W. C. Abbott
Robert Head

Inventor:
F. H. Richards.

No. 882,842. PATENTED MAR. 24, 1908.
F. H. RICHARDS.
CARVING MACHINE.
APPLICATION FILED MAY 22, 1902.

6 SHEETS—SHEET 4.

Witnesses:
O. C. Abbott
Robt. Head

Inventor:
F. H. Richards

No. 882,842. PATENTED MAR. 24, 1908.
F. H. RICHARDS.
CARVING MACHINE.
APPLICATION FILED MAY 22, 1902.
6 SHEETS—SHEET 5.
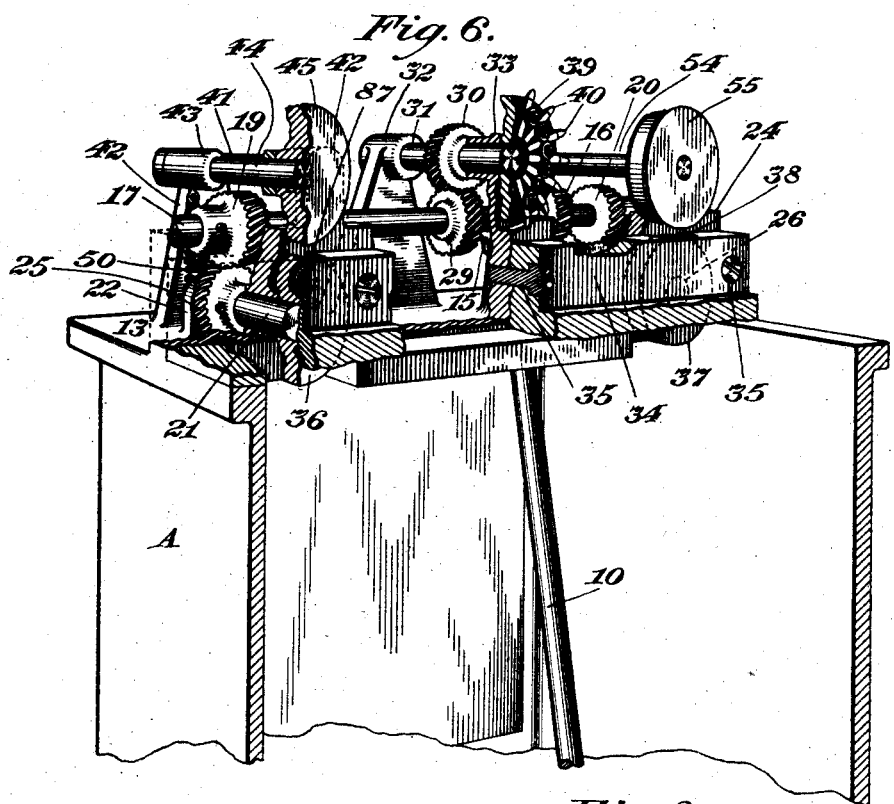
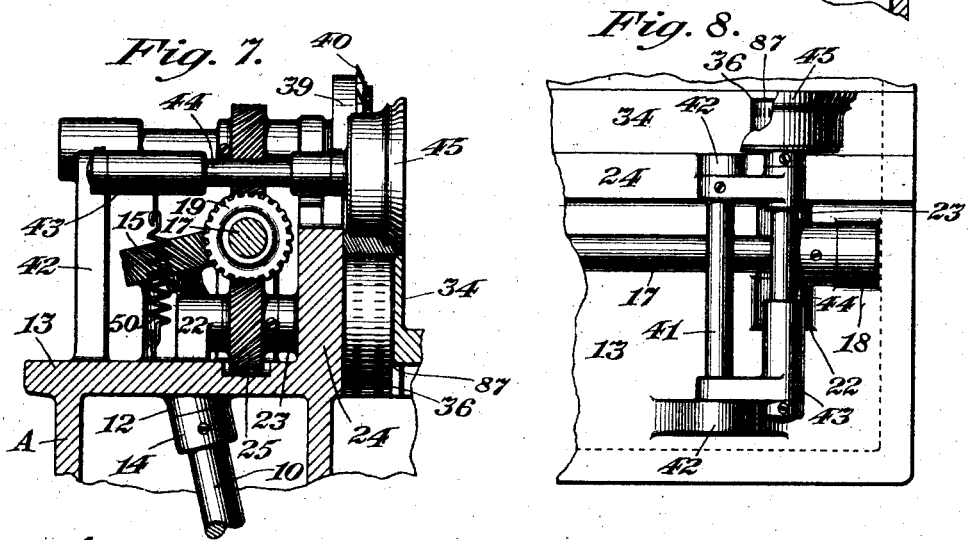
Witnesses:
A. C. Abbott
Robert Head
Inventor,
F. H. Richards.

No. 882,842. PATENTED MAR. 24, 1908.
F. H. RICHARDS.
CARVING MACHINE.
APPLICATION FILED MAY 22, 1902.
6 SHEETS—SHEET 6.
Horizontal tool movement. *Fig. 9.*
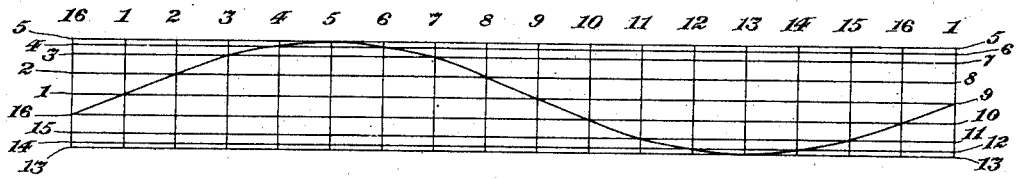
Lateral movement of carriage. *Fig. 10.*
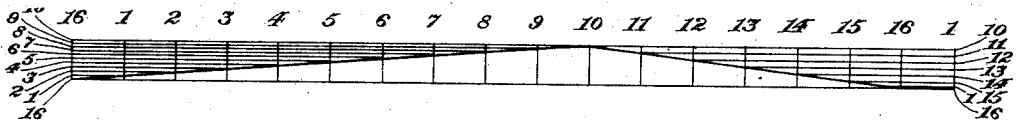
Uniform speed of stock. *Fig. 11.*
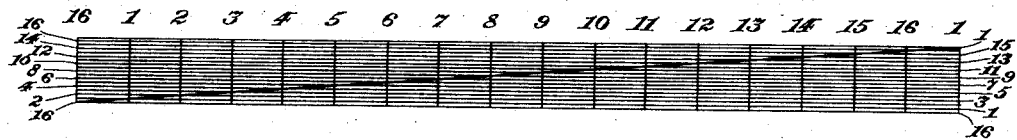
*Fig. 12.*
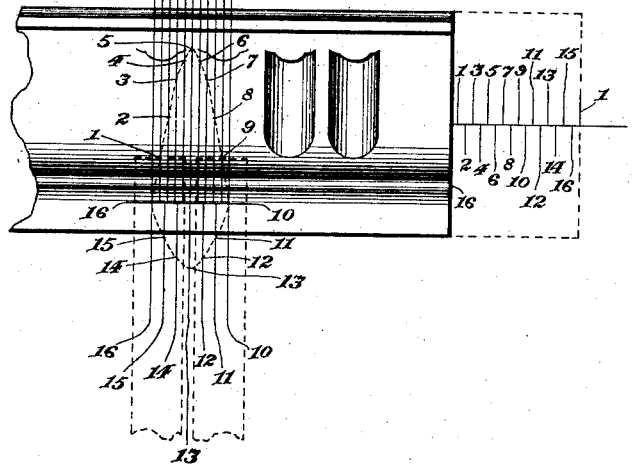
Witnesses:
Q. C. Abbott
Robert Head
Inventor,
F. H. Richards.
THE NORRIS PETERS CO., WASHINGTON, D. C.

UNITED STATES PATENT OFFICE.

FRANCIS H. RICHARDS, OF HARTFORD, CONNECTICUT.

CARVING-MACHINE.

No. 882,842.　　　　Specification of Letters Patent.　　Patented March 24, 1908.

Application filed May 22, 1902. Serial No. 108,461.

*To all whom it may concern:*

Be it known that I, FRANCIS H. RICHARDS, a citizen of the United States, residing at Hartford, in the county of Hartford and State of Connecticut, have invented certain new and useful Improvements in Carving-Machines, of which the following is a specification.

My present invention relates to machines for carving wood, moldings or the like, and more particularly pertains to this class of carving machines in which the feed of the stock is continuous and the cutting elements are caused to follow the movement of the stock during that period in which the carving action takes place and in which a quick return of the tools is made possible, as well as the embodiment and combination in a practical machine of a rotary cutter for making relatively short cuts and a translationally movable cutter for making the longer incisions necessary.

One of the objects of my invention is to produce a practical, efficient machine of the character above set forth which will be capable of continued use with a minimum amount of wear and vibration.

My present invention consists in the organization and novel combinations of elements hereinafter more fully set forth and claimed.

Figure 1:
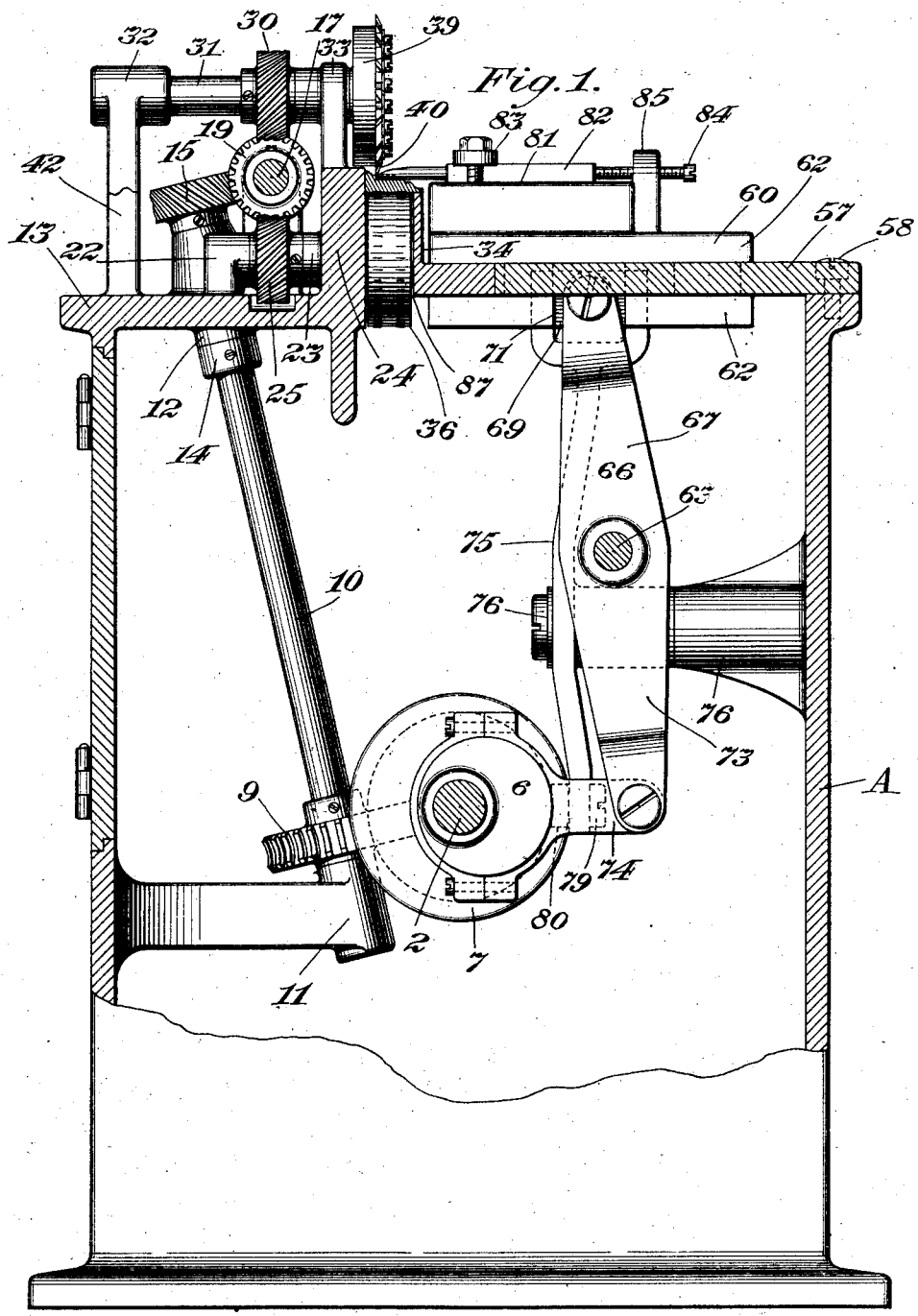
Figure 2:
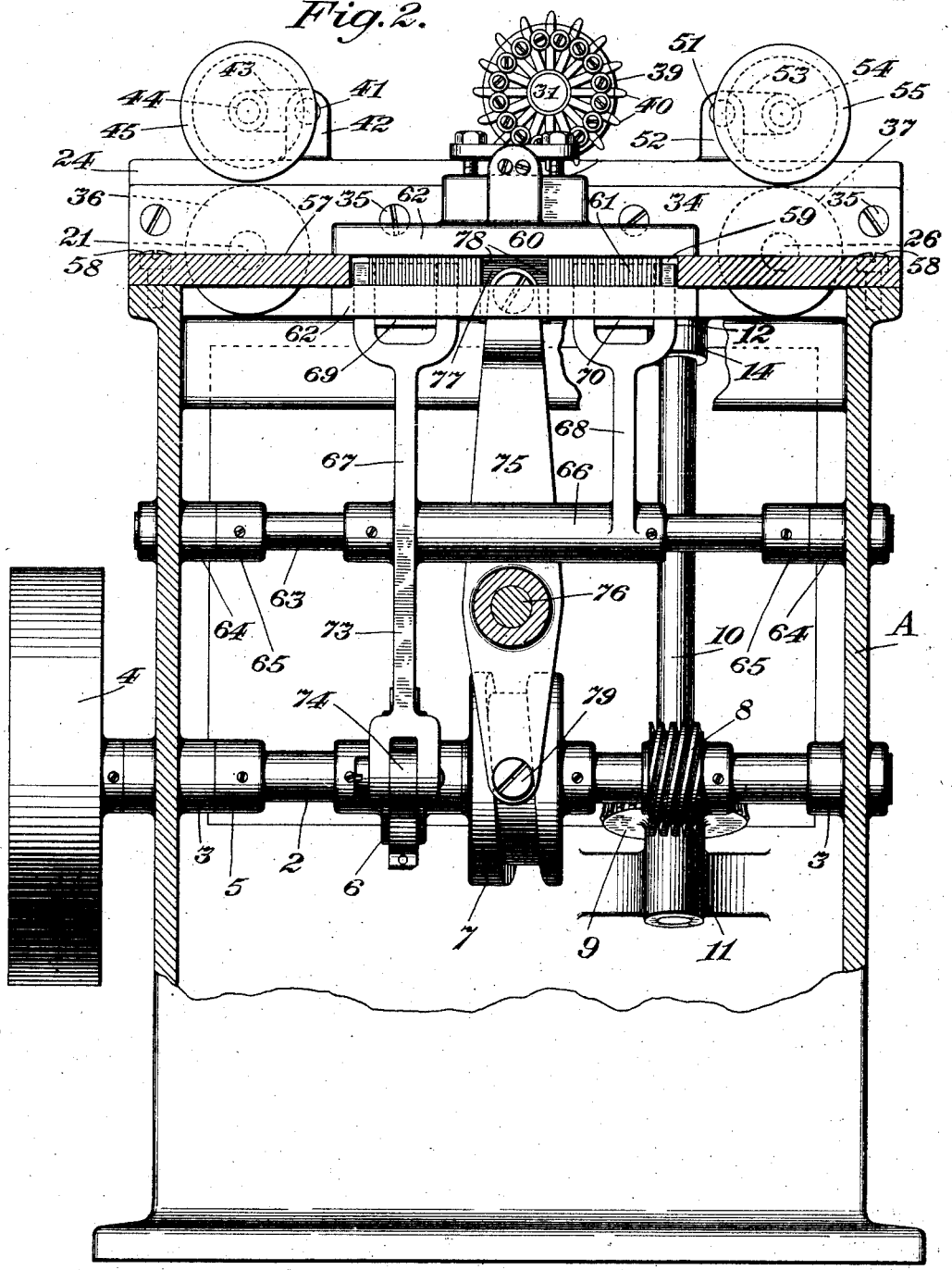
Figure 3:
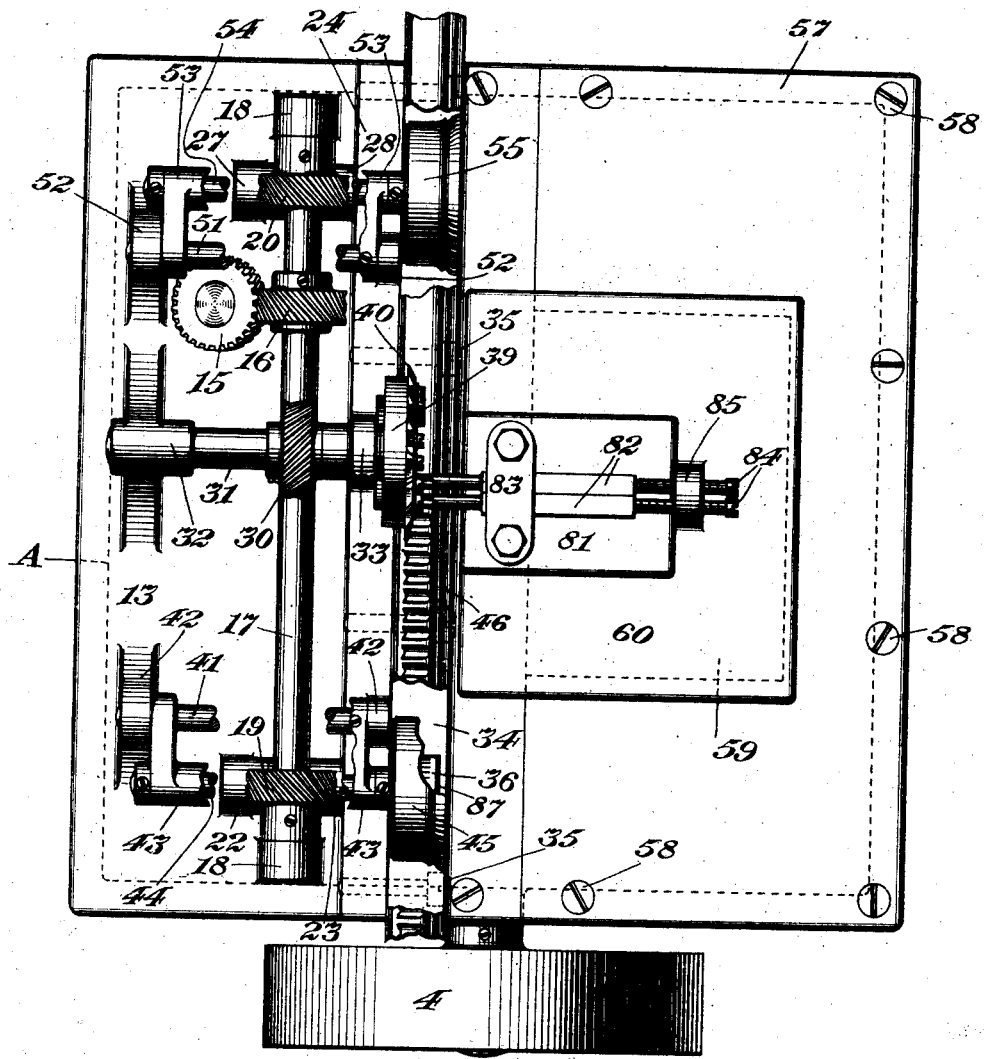
Figure 4:
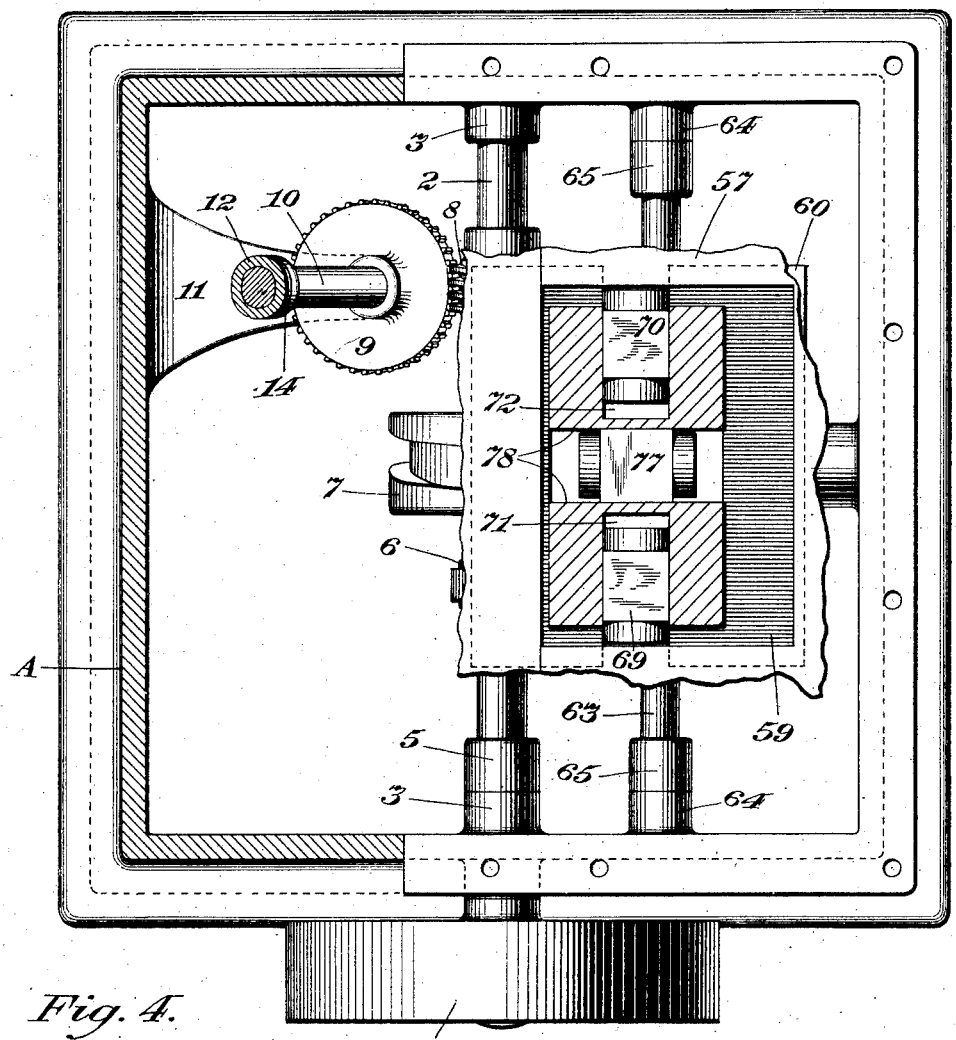
Figure 5:
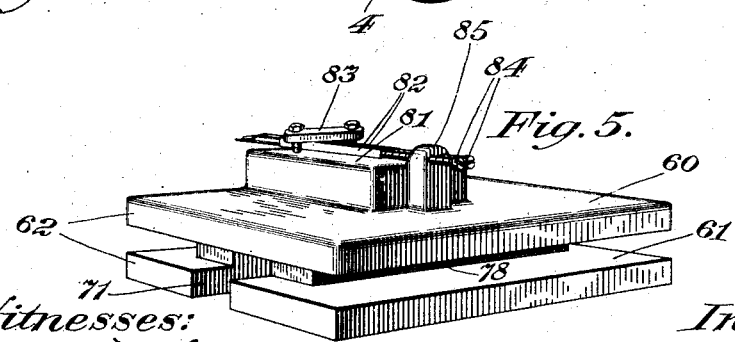

My invention is illustrated in one embodiment of the same in the accompanying drawings, in which a carving machine is shown in Figure 1 as a front elevational view with the front wall removed to more closely show the parts; Fig. 2, a right side elevation showing the nearest side wall removed; Fig. 3, a plan view showing the stock in position to be operated upon; Fig. 4, a plan view of the interior of the machine, the top portions of the frame A being removed or broken away to show the lower portion of said mechanism, the carriage 60 being shown in horizontal cross-section through the perimetral groove therein; Fig. 5 shows a detail in perspective of the tool-carrying carriage; Fig. 6 is a vertical section in perspective showing the mechanism of the feed rolls and rotary cutter somewhat broken away; Fig. 7 shows a detail end view of the feed mechanism; Fig. 8 shows a detail plan view of same; Figs. 9, 10 and 11 show time charts of the movements of the carriage and stock and their operating mechanism, and Fig. 12 shows a diagrammatic view of a piece of stock and the relative movements of the cutters to the stock during the cycle of the machine.

Referring to the drawings, the machine is mounted and assembled upon a box-like frame A. A horizontal driving shaft 2 is mounted longitudinally of the frame A in bearings 3 in the walls of said frame A. The driving shaft 2 extends through one wall of the frame A and is provided without said frame upon a projecting portion with a driving pulley 4. The driving shaft 2 is restricted against longitudinal movement by the hub of the driving pulley 4 and a collar 5 on said shaft abutting the opposite sides of one of the bearings 3.

Referring to Fig. 2, the driving shaft 2 is provided upon that portion lying entirely within the frame A, beginning at the left with an eccentric 6, with a cam-groove wheel 7 and a spiral gear 8, all mounted fast upon said shaft 2. A spiral gear 9 meshing with the spiral gear 8 is mounted upon the shaft 10, which shaft 10, is journaled in a bearing 11 projecting from one of the walls of the frame A and a bearing 12 in a top plate 13 of the frame A. The shaft 10 is restricted against longitudinal movement by the abutment of spiral gear 9 with the bearing 11 and the abutment of a collar 14 mounted upon said shaft 10 with the opposite side of the bearing 12. The shaft 10 projects through the bearing 12 and the top plate 13 of the frame A and is provided upon its projecting end with a spiral gear 15.

The driving shaft 2 is mounted at about the central portion of the frame A and the shaft 10 is inclined in such a manner that its upper end will more nearly approach one side of the frame A. This shaft 10 is geared to make one revolution to eight revolutions of the driving shaft 2.

A spiral gear 16 meshing with the spiral gear 15 is mounted fast upon a horizontal shaft 17 which is monted longitudinally of the frame A in bearings 18 18 upstanding from the top plate 13. The shaft 17 is restricted against longitudinal movement by the abutment of the hubs of two spiral gears 19 and 20 against the inner faces of the bearings 18 18. The spiral gear 16 is geared with the spiral gear 15 to produce a ratio of one to one between the shafts 10 and 17.

A shaft 21 is mounted directly beneath the shaft 17 and at right angles thereto in the plane of rotation of the gear 19 in a bearing 22 upstanding from the top plate 13 of the frame A, and a bearing 23 in an upstanding flange 24 of the said top plate 13. A spiral gear 25 is mounted fast on the shaft 21 and meshes with the spiral gear 19 on the shaft 17 in the ratio of one to one. A shaft 26 is mounted directly beneath the shaft 17 and at right angles thereto in the plane of rotation of the gear 20 in a bearing 27 from the top plate 13 of the frame A and a bearing 28 in an upstanding flange 24 of the said top plate 13.

A spiral gear 29 is mounted fast on the shaft 17 intermediate the spiral gears 19 and 20 and meshes with a spiral gear 30 fast on a horizontal shaft 31 mounted directly above and at right angles to the shaft 17 in the plane of rotation of said gear 29 in a bearing 32 upstanding from the top plate 13 of the frame A and a bearing 33 upstanding from the flange 24 of said top plate 13. A stock guide 34 is secured to the flange 24 by screws 35, said stock guide being parallel with the shaft 17.

The shafts 21 and 26 project through the bearings 23 and through the flange 24 and are provided upon their projecting portions with feed rolls 36 and 37 of equal diameter, which feed rolls are disposed within hollows 37 and 38 in the stock guide and their peripheries project slightly above the floor of said stock guide and may be provided with roughened surfaces or gripping teeth.

The shaft 31 projects through the bearing 33 and is provided upon its projecting portion with a rotary cutter chuck 39 carrying peripherally directed tools 40 which will be knives of suitable formation secured thereto. That portion of the cutter chuck 39 carrying the tools 40 overhangs the stock guide 34 in such a manner that the tools 40 will engage and incise stock lying within said stock guide.

A shaft 41 is mounted transversely of the frame A in bearings 42 upstanding from the top plate 13 of the frame A and a frame 43 is pivoted thereon and carries a shaft 44 which overhangs the stock guide 34 and carries upon its overhanging portion a presser roll 45 which is adapted to press upon stock lying in the stock guide 34 directly above the feed roll 36. A spring 50 secured to said frame 43 and also to the top plate 13 maintains a downward pressure upon said frame 43 which presses the presser roll 45 upon the stock and insures a close engagement of the feed roll 36 with the stock.

A shaft 51 is mounted transversely of the frame A in bearings 52 upstanding from the top-plate 13 of the frame A and a frame 53 is pivoted thereon and carries a shaft 54 which overhangs the stock guide 34 and carries upon its overhanging portion a presser roll 55 which is adapted to press upon stock lying in the stock guide 34 directly above the feed roll 37. A spring 56 secured to said frame 53 and also to the top plate 13 maintains a downward pressure upon said frame 53 which presses the presser roll 55 upon the stock and insures a close engagement of the feed roll 37 with the stock.

The operation of this mechanism is as follows: When the driving shaft 2 is rotated the shaft 10 is driven therefrom one revolution to eight of said driving shaft 2, and the shaft 17 is driven from the shaft 10 at an equal speed therewith, that is, at one-eighth of the speed of the driving shaft 2. The shafts 21 and 26, and consequently the feed rolls 36 and 37, are driven in the same direction from the shaft 17 at the same speed therewith, that is, one revolution to eight of the driving shaft 2, and as the feed rolls 36 and 37 are of the same diameter stock (shown at 46) lying in the stock guide 34 will be fed along at an uniform velocity, the presser rolls 45 and 55 pressing the stock into active engagement with the feed rolls 36 and 37. The shaft 31, and consequently the rotary cutter chuck 39 carrying the tools 40, is geared with the shaft 17 to rotate in the opposite direction and is given the same speed as the shafts 21 and 26 but in the opposite direction thereto. The active periphery of the rotary cutter is equal to that of the feed rolls and as the rotary cutter is disposed above the stock and rotated in the opposite direction it will roll along the top face of the stock as the stock is fed uniformly by the feed rolls and incise by means of the tools 40 the stock. The rotary cutter chuck 39 carries sixteen tools and therefore makes sixteen incisions in the stock to each revolution of the shaft 31 or two incisions to one revolution of the driving shaft 2. The tools 40 make substantially perpendicular incisions in the stock, and in the machine illustrated these incisions are very short, which is the case with machines of this character for incising stock of the character for which this machine is designed. As the depth of these vertical incisions is not very great the rotary cutter is eminently satisfactory for the purpose and the arcual movement of the tools is not noticeable in the finished product. In designing a practical machine for operating upon continuously fed stock the form of rotary cutter for making shallow incisions is preferred as the organization of the mechanism for driving same is devoid of reciprocating movement and the consequent vibration accompanying the same. In the organization shown the resistance offered to the rotary cutter is practically constant throughout the operation of the machine. The remaining portion of the top of frame A is covered by a plate 57 secured to the frame A by screws 58. The plate 57 is provided with a rectangular aperture 59 which aperture when the plate 57 is removed from the frame A is open at one side but when the plate 57 is secured to the frame A is closed by a horizontal flange portion of the stock guide casting 43. This horizontal portion of the stock guide casting and the plate 57 form a continuous table with a rectangular aperture therein. A carriage 60 having a perimetrically-disposed groove 61 is adapted to be inserted in the aperture 59 of the plate 57 while said plate is removed from the frame A the flanges 62 forming the walls of the groove 61 of the carriage 60 grasping the plate 57 about the aperture 59 and when said plate 57 is put in place upon the frame A the said flanges 62 will also grasp the edge of the horizontal flange portion of the stock guide 34. The carriage at the base of the groove 61 is much smaller than the aperture 59 and may therefore be moved about within said aperture both longitudinally of the frame A and transversely thereof, while the flanges 62 are of much greater diameter than the aperture 59 and will not uncover any portion of said aperture at any point in the movement within said aperture.

A horizontal shaft 63 is mounted longitudinally of the frame A approximately beneath the aperture 59 in bearings 64 in walls of the frame A. The shaft 63 is restricted against longitudinal movement by fast collars 65 thereon abutting the inner surfaces of the bearing 64. A rocking beam 66 is mounted fast upon the shaft 63 and has two upwardly projecting arms 67 and 68, which arms 67 and 68 are bifurcated at their upper extremities and embrace and are pivoted to bearing blocks 69 and 70. The bearing blocks 69 and 70 are adapted to engage longitudinal guideways 71 and 72 opening from the underside of the carriage 60. The blocks 69 and 70 are slidable longitudinally in said guideways 71 and 72 and also to a limited extent vertically, but closely engage the walls of said guideways and control the lateral movement of said carriage. The arms 67 and 68 by means of the blocks 69 and 70 maintain the carriage 60 parallel to the stock guide 34 at all times but allow of the movement of said carriage independently longitudinally of the frame A. The beam 66 is provided with a downwardly extending arm 73 which is connected with a connecting rod 74 which in turn is strapped to the eccentric 6. Upon the rotation of the driving shaft 2 the eccentric 6 through the connecting rod 74 imparts a rocking movement to the beam 66 which through the bearing block connections already described imparts a reciprocating movement to the carriage 60 toward and away from the stock guide 34, but owing to the slidable nature of the bearing blocks 69 and 70 does not interfere with an independent longitudinal movement of said carriage 60.

A rocking arm 75 is pivoted upon a stud 76 projecting from the side wall of the frame A and extends above said stud and is bifurcated at its upper end, said bifurcated portion embracing and pivoted to a bearing block 77 adapted to slide transversely of the carriage 60 in guideways 78 opening from the underside of said carriage. The bearing block 77 closely engages the guideways 78 and controls the longitudinal movement of the carriage 60 but is slidable transversely of said carriage in said guideways and admits of the transverse movement of said carriage which is imparted by the beam 66. All of the bearing blocks are vertically movable in the guideways to a slight extent to provide for the arcual movement of the rocking members.

The rocking arm 75 is extended below the stud 76 and is provided on its lower extremity with a laterally projecting stud 79 upon which a loose roller 80 is mounted. The loose roller 80 engages the groove in the cam-groove wheel 7 which groove is designed and formed to rock the rocking arm 75 to impart a longitudinal movement to the carriage 60, which in the direction of the feed of the stock will be uniform and correspond to the movement of the stock, that is, the carriage 60 will move at the same speed as the stock. This movement with the stock, in the machine illustrated, is designed to take place during approximately five-eighths of a revolution of the driving shaft 2 and the return movement in opposition to the direction of movement of the stock will take place in the remaining three-eighths of a revolution of the driving shaft 2.

A tool bed 81 is formed upon the upper surface of the carriage 60 upon which tool bed two tools 82, which are knives of suitable formation, are secured by a tool clamp 83 and two set screws 84 84 are mounted in an upstanding lug 85 from the tool carriage 60 and bear upon the rear end of the tool shanks to render a fine adjustment of the tools possible and to in a measure take the thrust upon said tools.

The eccentric 6, the cam-groove wheel 7 and the spiral gear 8 are set upon the shaft 2 and timed to produce a movement of the carriage 60 with the moving stock in such a manner that the tools 82 upon the carriage 60 will exactly register with two incisions previously made by the tools 40 on the rotary cutter and during the movement of said carriage 60 with the moving stock the carriage 60 will be carried toward the stock causing the tools 82 to incise and chip out the ornamental figure desired and clear the stock. It will be noted by reference to Fig. 12 that the tools 82, the path of one of which is indicated by dotted lines, and sixteen consecutive positions of all of the parts during one revolution of the driving shaft 2 are indicated by numerals from 1 to 16 commencing at the position of the tool where it first engages the stock will be carried upon the carriage 60 through one-sixteenth of a revolution of the driving shaft 2 and thereby allow momentum to be acquired by said carriage when the cutting stroke begins and will also leave the stock one-sixteenth of a revolution of the driving shaft 2 before the carriage 60 is reversed or before the momentum is overcome and movement in the opposite direction acquired. The tools 82 will be stationary relatively of the stock during their cutting stroke and therefore a clean long cut is made possible, while the return movement is relatively short. As illustrated, half of a revolution of the driving shaft 2 is occupied in making the cut and withdrawing the tool, while one-eighth is occupied in allowing the carriage 60 to acquire and to overcome its momentum and three-eighths is occupied in returning the carriage 60 to its initial point to engage and incise the stock in register with the two succeeding incisions previously made by the rotary cutter, and so on.

In Figs. 9, 10 and 11 the movements of the several moving agencies are illustrated by their curves, showing the timing of the parts and illustrating such timing in sixteen consecutive positions of the parts during one revolution of the driving shaft 2. The time charts will be readily understood.

It is obvious that various changes may be made in the construction and details of my device, and that the organization may be differently arranged to meet the exigencies of certain particular cases and variously designed stock to be operated upon, and that equivalent mechanical construction may be used in my organization without departing from the spirit and principle of my invention.

The commercial features of my invention will be readily understood by one skilled in the art, and the novel construction and arrangements will be obvious to those having knowledge of this type of machines.

The importance of constructing and designing a machine which will be practical, efficient, and capable of turning out a large amount of finished product in conjunction with such a construction as will render the machine capable of continued operation with a minimum of deterioration is obvious, and this has been the aim in the construction and perfection of the present machine.

Having described my invention, I claim—

1. In a carving machine, a carriage having a perimetrical rabbet, and an apertured frame embracing and supporting said carriage by engagement in said rabbet and permitting within the limits of the engagement of said frame in said rabbet a free movement of said carriage in transverse directions, a cutting tool upon said carriage, a coöperating tool rotatably mounted for incising the stock in a different direction, and stock-feeding and guiding means.

2. In a carving machine, a carriage, an apertured frame supporting said carriage by engagement with an under surface thereof and permitting a free movement of said carriage within limits in transverse directions, power driven mechanism connected with said carriage through the aperture in said frame for imparting a circuitous translational movement to said carriage in transverse directions, a knife upon said carriage for incising the stock in some of the movements of the carriage, a coöperating knife rotatably mounted for incising the stock in a different direction, and stock feeding and guiding means.

3. In a carving machine, a carriage, an apertured frame supporting said carriage by engagement with an under surface thereof and permitting within the limits of such engagement a free movement of said carriage, relatively transverse guideways in the under surface of said carriage, and power driven mechanism engaging said guideways for imparting a circuitous translational movement to said carriage.

4. In a carving machine, a carriage having a perimetrical rabbet, an apertured frame supporting said carriage by engagement in said rabbet and permitting within the limits of the engagement of said frame in said rabbet a free movement of said carriage, relatively transverse guideways in the under surface of said carriage, and power driven mechanism engaging said guideways for imparting a circuitous translational movement to said carriage.

5. In a carving machine, a carriage having a perimetrical groove, an apertured frame supporting said carriage by engagement in said groove and permitting within the limits of the engagement of said frame in said groove a free movement of said carriage, relatively transverse guideways in the under surface of said carriage and cam driven mechanism engaging said guideways for imparting a circuitous translational movement to said carriage.

6. In a carving machine, a carriage having a perimetrical rabbet, an apertured plate supporting said carriage by engagement in said rabbet and permitting within the limits of the engagement of said plate in said rabbet a free movement of said carriage, relatively transverse guideways in the under surface of said carriage, and power driven mechanism engaging said guideways for imparting a circuitous translational movement to said carriage.

7. In a carving machine, a carriage, an apertured frame supporting said carriage by engagement with an under surface thereof and permitting within the limits of such engagement a free movement of said carriage, two rocking-levers mounted opposite said aperture, said rocking-levers having relatively transverse planes of oscillation and connected with said carriage through said aperture and operable to impart a circuitous translational movement to said carriage.

8. In a carving machine, a carriage having a perimetrical groove, an apertured frame supporting said carriage by engagement in said groove and permitting within the limits of such engagement a free movement of said carriage, two rocking-levers mounted opposite said aperture, said rocking-levers having relatively transverse planes of oscillation and connected with said carriage and operable to impart a circuitous translational movement to said carriage.

9. In a carving machine, a carriage having a perimetrical rabbet, an apertured frame supporting said carriage by engagement with said rabbet and permitting within the limits of such engagement a free movement of said carriage, two rocking-levers mounted opposite said aperture, said rocking-levers having relatively transverse planes of oscillation and connected with said carriage, a power driven shaft and operative connections between said power driven shaft and said rocking-levers to rock the latter to impart a circuitous translational movement to said carriage.

10. In a carving machine, a carriage having a perimetrical rabbet, an apertured frame supporting said carriage by engagement with said rabbet and permitting within the limits of such engagement a free movement of said carriage, relatively transverse guideways in the lower surface of said carriage, two rocking-levers mounted opposite said aperture, said rocking-levers having relatively transverse planes of oscillation and engaging said guideways and operable to impart a circuitous translational movement to said carriage.

11. In a carving machine, a carriage, a frame, said carriage supported by and circuitously translatable upon said frame, relatively transverse guideways on said carriage, two rocking-levers having relatively transverse planes of oscillation, each of said rocking-levers engaging that said guideway which is transverse of its plane of oscillation, and means for rocking said rocking-levers to produce a circuitous translational movement of said carriage.

12. In a carving machine, a carriage, a frame, said carriage supported by and circuitously translatable upon said frame, relatively transverse guideways on said carriage, two rocking-levers having relatively transverse planes of oscillation, each of said rocking-levers carrying a pivoted bearing block engaging that said guideway which is transverse of its plane of oscillation, and means for rocking said rocking-levers to produce a circuitous translational movement of said carriage.

13. In a carving machine, a carriage, a frame, said carriage supported by and circuitously translatable upon said frame, relatively transverse guideways on said carriage, two rocking-levers having relatively transverse planes of oscillation, each of said rocking-levers engaging that said guideway which is transverse of its plane of oscillation, a power driven shaft parallel to the plane of oscillation of one of said rocking-levers and transverse of the plane of oscillation of the other of said levers, an axially operating driving member on said shaft connected with said former rocking-lever, and a radially operating driving member on said shaft connected with said latter rocking member, said members adapted to impart through said levers a circuitous translational movement to said carriage.

14. In a carving machine, a carriage, a frame, said carriage supported by and circuitously translatable upon said frame, relatively transverse guideways on said carriage, two rocking-levers having relatively transverse planes of oscillation, each of said rocking-levers engaging that said guideway which is transverse of its plane of oscillation, a power driven shaft parallel to the plane of oscillation of one of said rocking-levers and transverse of the plane of oscillation of the other of said levers, a cam groove wheel on said shaft with the groove of which wheel said former rocking-lever engages, and an eccentric on said shaft connected to said latter rocking-lever, said cam groove wheel and eccentric adapted to impart through said rocking-levers a circuitous translational movement to said carriage.

15. In a carving machine, a box-like frame having an aperture in the wall thereof, a carriage having a perimetrical groove, the frame about said aperture embracing and supporting said carriage by engagement in said groove and permitting within the limits of said engagement a free movement of said carriage, relatively transverse guideways on said carriage next the interior of said frame, two rocking-levers mounted within said frame having relatively transverse planes of oscillation, each of said rocking-levers engaging that said guideway which is transverse of its plane of oscillation, a power driven shaft mounted in said frame parallel to the plane of oscillation of one of said rocking-levers and transverse of the plane of oscillation of the other of said levers, a cam groove wheel on said shaft with the groove of which wheel said former rocking-lever engages, and an eccentric on said shaft connected to said latter rocking-lever, said cam groove wheel and eccentric adapted to impart through said rocking-levers a circuitous translational movement to said carriage.

16. In a carving machine, a box-like frame having an aperture in the wall thereof, a carriage having a perimetrical groove embraced by said frame and supported by the engagement of said frame adjacent said aperture in said groove, said engagement permitting within its limits a free movement of said carrier, in transverse directions the walls of said groove overlapping and completely closing said aperture throughout said movement, and power driven mechanism inclosed within said frame and engaging said carriage through said aperture for imparting a circuitous translational movement to said carriage.

17. In a carving machine, a carriage, a frame, said carriage supported by and circuitously translatable upon said frame, a stock guide on said frame, one or more tools mounted on said carriage and directed transversely of said stock guide, relatively transverse guideways on said carriage, two rocking levers having relatively transverse planes of oscillation, each of said rocking levers engaging that said guideway which is transverse of its plane of oscillation, a power driven shaft parallel to the plane of oscillation of one of said rocking levers and transverse of the plane of oscillation of the other of said levers, and operative connections between said shaft and rocking levers patterned and arranged to effect a circuitous translation of said carriage at predetermined velocities relatively of said stock guide.

18. In a carving machine, a carriage, a frame, said carriage supported by and circuitously translatable upon said frame, a stock guide on said frame, one or more tools mounted on said carriage and directed transversely of said stock guide, relatively transverse guideways on said carriage, two rocking levers having relatively transverse planes of oscillation, each of said rocking levers engaging that said guideway which is transverse of its plane of oscillation, a power driven shaft parallel to the plane of oscillation of one of said rocking levers and transverse of the plane of oscillation of the other of said levers, and operative connections between said shaft and rocking levers patterned and arranged to effect a circuitous translation of said carriage at a uniform velocity relatively of said stock guide.

19. In a carving machine, a carriage, a frame, said carriage supported by and circuitously translatable upon said frame, a stock guide on said frame, one or more tools mounted on said carriage and directed transversely of said stock guide, a guideway on said carriage parallel of said stock guide, a guideway on said carriage transverse of said stock guide, a rocking lever oscillatable in a plane transverse to said stock guide and engaging with said guideway parallel of said stock guide, a rocking lever oscillatable in a plane parallel to said stock guide and engaging said guideway transverse of said stock guide, a power driven shaft parallel to the plane of oscillation of one of said rocking levers and transverse of the plane of oscillation of the other of said rocking levers, and operative connections between said shaft and rocking levers patterned and arranged to effect a circuitous translation of said carriage at predetermined velocities relatively of said stock guide.

20. In a carving machine, a carriage, a frame, said carriage supported by and circuitously translatable upon said frame, a stock guide on said frame, one or more tools mounted on said carriage, and directed transversely of said stock guide, a guideway on said carriage parallel of said stock guide, a guideway on said carriage transverse of said stock guide, a rocking lever oscillatable in a plane transverse to said stock guide and engaging with said guideway parallel of said stock guide, a rocking lever oscillatable in a plane parallel to said stock guide, and engaging said guideway transverse of said stock guide, a power driven shaft parallel to the plane of oscillation of one of said rocking levers and transverse of the plane of oscillation of the other of said rocking levers, and operative connections between said shaft and rocking levers patterned and arranged to effect a circuitous translation of said carriage at an uniform velocity relatively of said stock guide.

21. In a carving machine, a carriage, a frame, said carriage supported by and circuitously translatable upon said frame, a stock guide on said frame, one or more tools mounted on said carriage and directed transversely of said stock guide, said stock guide positioned parallel to the plane of movement of said carriage to guide stock within the travel of said tools, a guideway on said carriage parallel of said stock guide, a guideway on said carriage transverse of said stock guide, a rocking lever oscillatable in a plane transverse to said stock guide and engaging with said first guideway, a rocking lever oscillatable in a plane parallel to said stock guide and engaging said second guideway, a power driven shaft parallel to the plane of oscillation of said second rocking lever and transverse of the plane of oscillation of said first rocking lever, a stock feed geared to said shaft and adapted to feed stock along said stock guide, and connections between said shaft and said rocking levers patterned and arranged to rock said levers to effect a circuitous translation of said carriage, the said second rocking lever moving said carriage in the direction of the feed of the stock at corresponding velocities to those of said stock.

22. In a carving machine, a frame, a stock guide on said frame, a power driven shaft mounted in said frame, a carriage supported by and circuitously translatable upon said frame, one or more tools mounted upon said carriage and directed transversely of said stock guide, relatively transverse guideways upon said carriage, two rocking levers having relatively transverse planes of oscillation, each of said rocking levers engaging that said guideway which is transverse of its plane of oscillation, a power driven shaft, a feed roll adapted to feed stock along said stock guide, a rotary cutter, said feed roll and rotary cutter geared to said shaft to acquire velocities inversely as the extent of their active peripheries, operative connections between said shaft and rocking levers patterned and arranged to rock said levers to effect a circuitous translation of said carriage which in the direction of the feed corresponds to the velocities of said feed.

23. In a carving machine, the combination with stock-guiding and feeding means, of a knife carriage and a knife carried thereby, a shaft, means for rocking said shaft, means projecting from said shaft into engagement with said carriage for reciprocating and guiding the latter, means for simultaneously moving said carriage to and fro in a direction transverse to said reciprocation, and a cutting member complemental to said knife and rotatably mounted for incising the stock in a different direction and means for rotating said member in the direction of the feed movement.

24. In a carving machine, the combination with stock-guiding and feeding means, of a tool carriage, a rocking member, means for enabling said rocking member to reciprocate and guide said carriage, the latter being mounted for movement in a plane parallel with the axis of said rocking member, means for simultaneously moving said carriage to and fro in a direction transverse to said reciprocation, and a coöperataive cutting member mounted for incising the stock in a different direction and means for rotating said member in the direction of the feed movement.

25. In a carving machine, the combination with stock-guiding and feeding means, of a knife carriage and a knife carried thereby, a pair of arms rigidly connected, means for rocking said arms, means for connecting said arms to said carriage so as to reciprocate and guide the latter, means for moving said carriage to and fro in a direction transverse to said reciprocation, and a cutting member complemental to said knife and rotatably mounted for incising the stock in a different direction and means for rotating said member in the direction of the feed movement.

26. In a carving machine, the combination with stock-guiding and feeding means, of a tool carriage, a pair of arms rigidly connected, means for rocking said arms, means, including a pair of slide-blocks pivoted upon the ends of said arms, and slideways upon said carriage engaged by said blocks, for connecting said arms to said carriage so as to reciprocate and guide the latter, means for moving said carriage to and fro in a direction transverse to said reciprocation and parallel with said slideways, and a coöperative cutting member mounted for incising the stock in a different direction.

27. In a carving machine, the combination with stock-guiding and feeding means, of a knife carriage, a shaft, means for rocking said shaft, means projecting from said shaft into engagement with said carriage for reciprocating and guiding the latter in a direction at right angles to the stock guide, means for simultaneously moving said carriage to and fro in a direction parallel with the stock guide, and a cutting member complemental to said knife and rotatably mounted for incising the stock in a different direction.

28. In a carving machine, the combination with a stock-guide and stock-feeding means, of a tool carriage, a table, a shaft mounted below the table and parallel with the stock-guide, means for rocking said shaft, a pair of arms extending upwardly from said shaft, slide blocks pivoted upon the ends of said arms, slideways upon the carriage parallel with said stock-guide and engaged by said slide blocks, means for moving the carriage to and fro longitudinally of the stock-guide, and a coöperative cutting member mounted to incise the stock in a different direction.

29. In a carving machine, the combination with a stock-guide and stock-feeding means, of a tool carriage, a table, a shaft mounted below the table and parallel with the stock-guide, means for rocking said shaft, a pair of arms extending upwardly from said shaft, slide blocks pivoted upon the ends of said arms, slideways upon the carriage parallel with said stock-guide and engaged by said slide blocks, a slideway in said carriage at right angles to said stock-guide, an arm having means to engage said slide way, means for vibrating said arm, and a coöperative cutting member mounted to incise the stock in a different direction.

30. In a carving machine, the combination with stock guiding and feeding means, of a knife carriage, a shaft, means for rocking said shaft, means projecting from said shaft into engagement with said carriage for reciprocating and guiding the latter, means for simultaneously moving said carriage to and fro in a direction transverse to said reciprocation, and a cutting member complemental to said knife and mounted for incising the stock in a different direction and for movement in the direction of the stock-feeding movement.

31. In a carving machine, the combination with a stock-guide and uniformly acting stock-feeding means, of a tool carriage, a rocking member, means for enabling said rocking member to reciprocate and guide said carriage, the latter being mounted for movement in a plane parallel with the axis of said rocking member, means for simultaneously moving said carriage to and fro in a direction transverse to said reciprocation, and so that in one direction it may move coincidently with the stock-feeding movement, and a coöperative cutting member mounted for incising the stock in a different direction.

32. In a carving machine, the combination with a stock guide and uniformly acting stock-feeding means, of a tool carriage, a knife carried thereby, a shaft, means for rocking said shaft, means projecting from said shaft into engagement with said carriage for reciprocating and guiding the latter in a direction at right angles to the stock guide, means for simultaneously moving said carriage to and fro in a direction parallel with the stock guide and so that in one direction it may move coincidently with the stock-feeding movement, and a cutting member complemental to said knife and mounted for incising the stock in a different direction, and for movement in the direction of the stock-feeding movement.

33. In a carving machine, the combination with a stock-guide and stock-feeding means, of a tool carriage, a table, a shaft mounted below the table and parallel with the stock-guide, means for rocking said shaft, a pair of arms extending upwardly from said shaft, slide blocks pivoted upon the ends of said arms, slideways upon the carriage parallel with said stock-guide and engaged by said slide blocks, means for moving the carriage to and fro longitudinally of the stock-guide, a slideway in said carriage at right angles to said stock-guide, an arm having means to engage said slideway, and means for vibrating said arm, and a rotatory cutting member mounted to incise the stock in a different direction.

FRANCIS H. RICHARDS.

Witnesses:
  FRED. J. DOLE,
  JOHN O. SEIFERT.